United States Patent
Mantor et al.

(10) Patent No.: US 11,386,520 B2
(45) Date of Patent: *Jul. 12, 2022

(54) REDUNDANCY METHOD AND APPARATUS FOR SHADER COLUMN REPAIR

(71) Applicant: Advanced Micro Devices, Inc., Santa Clara, CA (US)

(72) Inventors: Michael J. Mantor, Orlando, FL (US); Jeffrey T. Brady, Orlando, FL (US); Angel E. Socarras, Lake Mary, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,827

(22) Filed: Dec. 7, 2020

(65) Prior Publication Data

US 2021/0090208 A1    Mar. 25, 2021

Related U.S. Application Data

(63) Continuation of application No. 15/156,658, filed on May 17, 2016, now Pat. No. 10,861,122, which is a
(Continued)

(51) Int. Cl.
*G06T 1/20* (2006.01)
*G06T 1/60* (2006.01)
*G09G 5/36* (2006.01)

(52) U.S. Cl.
CPC ............. *G06T 1/20* (2013.01); *G06T 1/60* (2013.01); *G09G 5/363* (2013.01); *G09G 2360/06* (2013.01)

(58) Field of Classification Search
CPC . G06T 1/20; G06T 1/60; G09G 5/363; G09G 2360/06
See application file for complete search history.

(56) References Cited

U.S. PATENT DOCUMENTS

| | | |
|---|---|---|
| 5,218,680 A | 6/1993 | Farrell et al. |
| 5,748,872 A | 5/1998 | Norman |

(Continued)

FOREIGN PATENT DOCUMENTS

| | | | |
|---|---|---|---|
| CN | 1423198 A | 6/2003 | |
| CN | 1942922 A | 4/2007 | |

(Continued)

OTHER PUBLICATIONS

Asato Akira, "Evaluation of a Code Compaction Method on Geometry Processor 'Procyon'", pp. 95-102, Issue 7, vol. 98, Jun. 3, 1998, Information Processing Society of Japan, Japan, 1998 Symposium on Parallel Processing, with English language abstract.

(Continued)

*Primary Examiner* — Peter Hoang
(74) *Attorney, Agent, or Firm* — Volpe Koenig

(57) ABSTRACT

Methods and systems are described. A system includes a redundant shader pipe array that performs rendering calculations on data provided thereto and a shader pipe array that includes a plurality of shader pipes, each of which performs rendering calculations on data provided thereto. The system also includes a circuit that identifies a defective shader pipe of the plurality of shader pipes in the shader pipe array. In response to identifying the defective shader pipe, the circuit generates a signal. The system also includes a redundant shader switch. The redundant shader switch receives the generated signal, and, in response to receiving the generated signal, transfers the data for the defective shader pipe to the redundant shader pipe array.

16 Claims, 6 Drawing Sheets

Related U.S. Application Data continuation of application No. 14/808,113, filed on Jul. 24, 2015, now Pat. No. 9,367,891, which is a continuation of application No. 12/476,158, filed on Jun. 1, 2009, now Pat. No. 9,093,040.

(60) Provisional application No. 61/057,492, filed on May 30, 2008, provisional application No. 61/057,504, filed on May 30, 2008, provisional application No. 61/057,513, filed on May 30, 2008, provisional application No. 61/057,483, filed on May 30, 2008, provisional application No. 61/057,499, filed on May 30, 2008.

(56) References Cited

U.S. PATENT DOCUMENTS

| | | | |
|---|---|---|---|
| 6,021,511 A | 2/2000 | Nakano | |
| 6,785,840 B1* | 8/2004 | Smith | G06F 11/2007 710/305 |
| 7,073,088 B2 | 7/2006 | Jo | |
| 7,110,006 B2 | 9/2006 | MacInnis et al. | |
| 7,280,107 B2 | 10/2007 | Whitted et al. | |
| 7,352,374 B2 | 4/2008 | Brown Elliott et al. | |
| 2002/0093517 A1 | 7/2002 | Cheung | |
| 2005/0066148 A1* | 3/2005 | Luick | G06F 9/30101 712/1 |
| 2006/0053188 A1* | 3/2006 | Mantor | G06F 11/2028 708/490 |
| 2006/0093044 A1 | 5/2006 | Grantham et al. | |
| 2006/0101307 A1 | 5/2006 | Rapp et al. | |
| 2007/0011434 A1 | 1/2007 | Luick | |
| 2008/0094405 A1 | 4/2008 | Bastos et al. | |
| 2009/0051687 A1 | 2/2009 | Kato et al. | |

FOREIGN PATENT DOCUMENTS

| | | |
|---|---|---|
| CN | 101189601 A | 5/2008 |
| JP | 04-220844 A | 8/1992 |
| JP | 2001-527218 A | 12/2001 |
| JP | 2005-534091 A | 11/2005 |
| JP | 2007-533029 A | 11/2007 |
| JP | 2007-328774 A | 12/2007 |
| WO | 2007-049610 A1 | 3/2007 |

OTHER PUBLICATIONS

First Office Action (with English Language Translation) directed to related Chinese Patent Application No. 200980119971.5, dated Oct. 8, 2012, 25 pages.

Office Action dated Aug. 21, 2013, in Japanese Patent Application No. 2011-511648, Mr. Hayakawa Yuji et al., drafted Aug. 15, 2013 with English language translation.

Office Action dated May 14, 2013, in Chinese Patent Application No. 200880122341.9 with English language translation.

Office Action dated May 16, 2013, in Chinese Patent Application No. 200980119971.5 with English language translation.

Office Action dated Sep. 9, 2013, in Chinese Patent Application No. 200980119971.5 with English language translation.

Search Report and Written Opinion for International Application No. PCT/US09/03314 dated Jul. 23, 2009, 7 pages.

English language abstract of Japanese Patent No. JP 2001-527218 A, Dec. 25, 2001. European Patent Office, espacenet database—Worldwide.

English language abstract of Japanese Patent No. JP 2005-534091 A, Nov. 10, 2005 European Patent Office, espacenet database—Worldwide.

English language abstract of PCT No. WO 2007/049610, May 3, 2007. European Patent Office, espacenet database—Worldwide.

English language abstract of Japanese Patent No. JP 2007-533029 A, Nov. 15, 2007. European Patent Office, espacenet database—Worldwide.

English language abstract of Japanese Patent No. JP 2007-328774 A, Dec. 20, 2007. European Patent Office, espacenet database—Worldwide.

* cited by examiner

REDUNDANCY METHOD AND APPARATUS FOR SHADER COLUMN REPAIR

CROSS REFERENCE TO RELATED APPLICATIONS

This application is a continuation of U.S. patent application Ser. No. 15/156,658, filed May 17, 2016, which is a continuation of U.S. patent application Ser. No. 14/808,113, filed Jul. 24, 2015, which issued as U.S. Pat. No. 9,367,891 on Jun. 14, 2016, which is a continuation of U.S. patent application Ser. No. 12/476,158, filed Jun. 1, 2009, which issued as U.S. Pat. No. 9,093,040 on Jul. 28, 2015, which claims the benefit under 35 U.S.C. § 119(e) to U.S. Provisional Patent Application No. 61/057,513 filed May 30, 2008; U.S. Provisional Patent Application No. 61/057,483 filed May 30, 2008; U.S. Provisional Patent Application No. 61/057,504 filed May 30, 2008; U.S. Provisional Patent Application No. 61/057,492 filed May 30, 2008; and U.S. Provisional Patent Application No. 61/057,499 filed May 30, 2008; all of which are incorporated by reference herein in their entireties.

BACKGROUND

Field of the Invention

The present invention is generally directed to computing operations performed in computing systems, and more particularly directed to graphics processing tasks performed in computing systems.

Related Art

A graphics processing unit (GPU) is a complex integrated circuit that is specially designed to perform graphics processing tasks. A GPU can, for example, execute graphics processing tasks required by an end-user application, such as a video game application. In such an example, there are several layers of software between the end-user application and the GPU.

The end-user application communicates with an application programming interface (API). An API allows the end-user application to output graphics data and commands in a standardized format, rather than in a format that is dependent on the GPU. Several types of APIs are commercially available, including DirectX® developed by Microsoft Corp. and OpenGL® developed by Silicon Graphics, Inc. The API communicates with a driver. The driver translates standard code received from the API into a native format of instructions understood by the GPU. The driver is typically written by the manufacturer of the GPU. The GPU then executes the instructions from the driver.

A GPU produces the pixels that make up an image from a higher level description of its components in a process known as rendering. GPU's typically utilize a concept of continuous rendering by the use of pipelines to process pixel, texture, and geometric data. These pipelines are often referred to as shader pipes or shader pipelines, "shader" being a term in computer graphics referring to a set of software instructions used by a graphic resource primarily to perform rendering effects. In addition, GPU's can also employ multiple pipelines in a parallel processing design to obtain higher throughput. A multiple of shader pipelines can also be referred to as a shader pipe array.

Periodically an error occurs somewhere within a pipeline as a shader pipe array, for example, as a result of a production defect. As the number of errors increase the overall yield of acceptable rendering calculations decreases. Typically the method used to correct a defective pipeline would be to recalculate the entire array of data within the shader pipe array. While this method can correct the defective pipeline data, it also consumes a fair amount of processing time to recalculate the entire array of data. This recalculation effort due to even a single defective element within a single pipeline effectively decreases a system's overall performance, or the production yield amount of effective product.

What are needed, therefore, are systems and/or methods to alleviate the aforementioned deficiencies. Particularly, what is needed is a highly efficient, cost effective approach to overcome the effects of a defective shader pipe with minimal impact on overall product production or performance.

BRIEF SUMMARY

Consistent with the principles of the present invention as embodied and broadly described herein, the present invention includes method and apparatus for shader pipeline repair comprising a shader pipe array, a redundant shader pipe array, a redundant shader switch, a sequencer, and a texture fetch system. During manufacturing test, system level test, or start up test, if a defect is noted, a control register is configured to map defective shader pipe columns to redundant shader pipe column. In normal operating mode, for example, if the redundant shader control register indicates a defect in a shader pipe column within the shader pipe array, data that was to be directed to the defective shader pipe column is transferred by a redundant shader switch directly via a horizontal path to a redundant shader pipe array column where it is processed. This can be controlled uniquely per row, or common for all rows. A defective shader pipe within the shader pipe array could be caused, for example, because of a manufacturing defect, post-manufacturing defect, component degradation, external interference, and/or inadvertent static discharge, or other electrical or environmental condition or occurrence. A shader pipe will be defective if a static or intermittent error condition is detected during testing. Testing can occur at the time of manufacturing or periodically (e.g., at the time of start-up or initialization) during use of the product. Once the data is processed by the redundant shader pipe array it is re-inserted into the correct output column by the redundant shader switch. In addition, the redundant shader switch synchronizes the redundant shader pipe array data so that the redundant shader pipe array data is correctly positioned and timed with other output data. In this manner, a defective shader pipe is "repaired" by re-routing data that was destined to a defective shader pipe to a redundant shader pipe for processing.

In an embodiment of the invention, the shader pipe array comprises one or more Vertical Shader Pipe Columns where each column is made up of one or more Shader Pipe blocks. In this embodiment the shader pipe array is configured as a (M N) array with M Vertical Shader Pipe Columns where each column comprises N rows of Shader Pipe blocks.

In another embodiment the redundant shader pipe comprises one or more Vertical Redundant Shader Pipe Columns where each column is made up of one or more Redundant Shader Pipe blocks. In this embodiment the redundant shader pipe array is configured as a (X·N) array with X Vertical Redundant Shader Pipe Columns where each column comprises N rows of Redundant Shader Pipe blocks.

In another embodiment where the redundant shader pipe comprises more than one Vertical Redundant Shader Pipe Column, the redundant shader pipe is capable of simultaneously receiving, processing, and outputting data destined to the more than one defective shader pipe column in a single shader pipe array to the more than one Vertical Redundant Shader Pipe Columns. As such, each redundant column is capable of repairing an individual column in the primary shader array.

In another embodiment the redundant shader pipe array would include an input and output module. The input module can transfer data to a redundant shader pipe column for processing that was initially destined to a defective shader pipe prior to the data entering the shader pipe array. In this embodiment the output unit of the shader pipe array would also multiplex the processed shader pipe array data from the redundant shader pipe array back into the correct output column and synchronize the output to coincide with other output data.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The accompanying drawings, which are incorporated in and constitute part of the specification, illustrate embodiments of the invention and, together with the general description given above and the detailed description of the embodiments given below, serve to explain the principles of the present invention. In the drawings.

Figure 1:
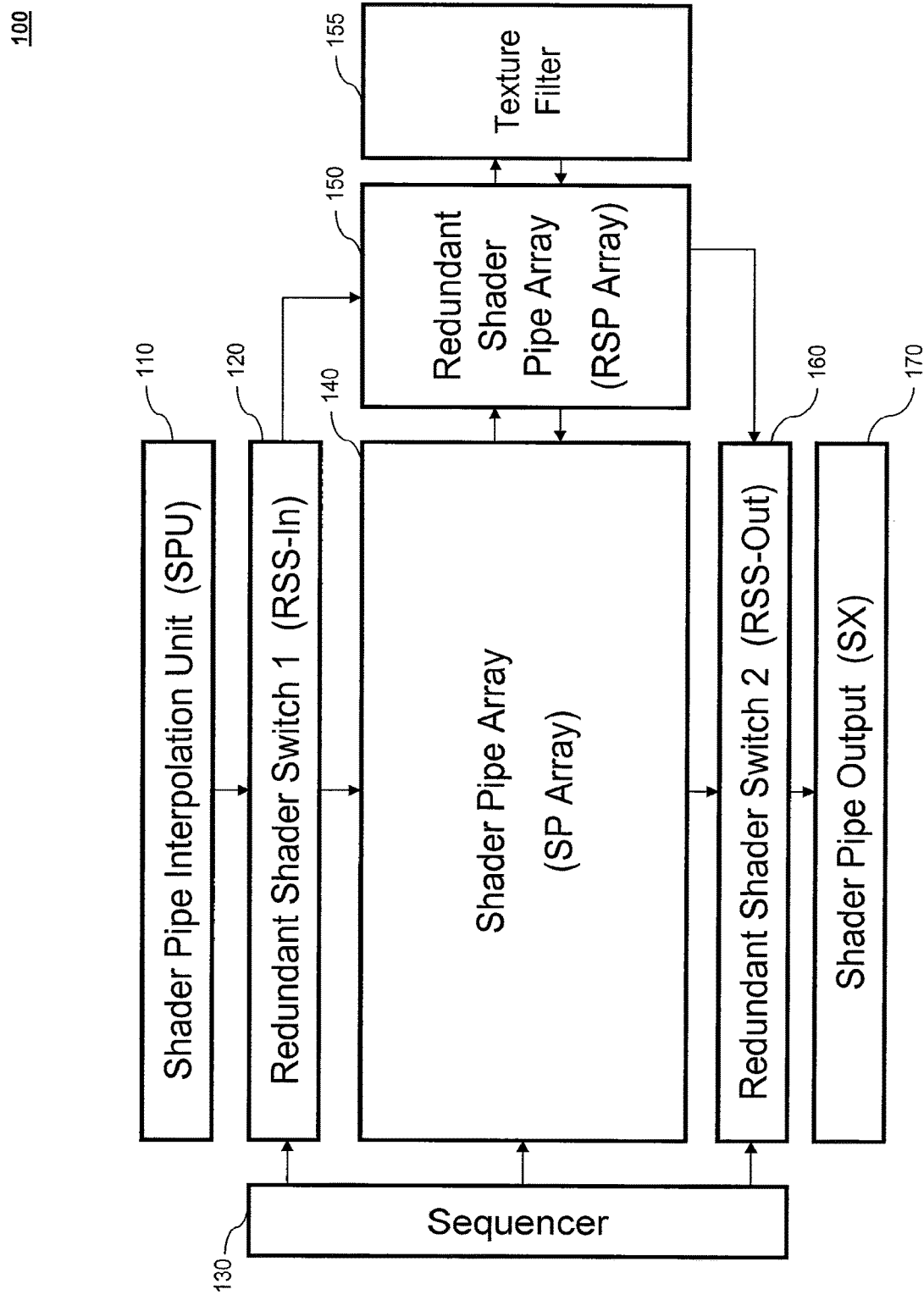
FIG. 1 is a system diagram depicting an implementation of a redundant shader pipe repair system.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The present invention relates to a shader pipe array wherein there is a redundant shader pipe array with the ability to process data destined to a defective shader pipe. In embodiments of this invention, defective shader pipes are identified and then through the use of a redundant shader switch, data that was destined to the identified defective shader pipe is instead transferred, via a horizontal path, to a redundant shader pipe array where the shader pipe data is processed. The redundant shader switch also controls returning the processed redundant shader pipe data to the correct output column at the correct time in line with other output data. In this manner the effects of a defective shader pipe can be repaired and the redundant shader pipe array can be used to increase the initial yield at the point of manufacture or to extend the useful life of a device where a subsequent defective shader pipe would otherwise render the device unusable or operating in a degraded condition.

While specific configurations, arrangements, and steps are discussed, it should be understood that this is done for illustrative purposes only. A person skilled in the pertinent art(s) will recognize that other configurations, arrangements, and steps can be used without departing from the spirit and scope of the present invention. It will be apparent to a person skilled in the pertinent art(s) that this invention can also be employed in a variety of other applications.

It is noted that references in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

FIG. 1 is an illustration of a shader system 100 within a graphics processing unit according to an embodiment of the present invention. System 100 comprises a shader a sequencer 130, a pipe array 140, a redundant shader switch (RSS) represented as RSS-In 120 and RSS-Out 160, a redundant shader pipe array 150, and a texture filter 155. Also shown are a shader pipe interpolation unit 110 that inputs pixel data and the shader pipe output 170 to which processed pixel data is directed.

Shader pipe array 140 performs shader program calculations on input data received from shader pipe interpolation unit 110 through RSS-In 120. RSS-In 120 controls the flow of input data to shader pipe array 140. Sequencer 130 controls the flow of data through shader pipe array 140 as well as to identify a defective shader pipe within shader pipe array 140. In the event that there is no defective shader pipe, the processed data continues through RSS-Out 160 to the shader pipe output 170.

In the event there is a defective shader pipe in shader pipe array 140, sequencer 130 notifies RSS-In 120 of the location of the defective shader pipe. RSS-In 120 then transfers the data destined to the defective shader pipe via a direct horizontal path from shader pipe array 140 to redundant shader pipe array 150. Redundant shader pipe array 150 is responsible to "effectively" repair the defective shader pipe by processing the shader pipe data originally targeted to be processed by the defective shader pipe. Once the shader pipe data is processed by redundant shader pipe array 150, the data is returned to RSS-Out 160 that places the redundant shader pipe data at the correct location and at the proper time as it would have been if the shader pipe had not been found to be defective.

Shader pipe array 140 and redundant shader pipe array 150 can also issue a texture request to texture filter 155. In this instance texture filter 155 generates appropriate addresses to cache system (not shown) that contains texel data associated with pixels.

The cache system, after receiving the address, will return the associated texel data to texture filter 155.

In another embodiment, in the event that there is no defective shader pipe, redundant shader pipe array 150 can be used for other purposes, including, as an example, additional rendering calculations on input data. As an alternative embodiment, if special diagnostic testing, e.g., software code or hardware testing circuitry, identifies a shader pipe to be only intermittently defective, or newly defective, then the control register (not shown) can be configured such that the shader pipe data for the intermittently, or newly, defective shader pipe would only be transferred to the redundant shader array for processing.

Figure 2:
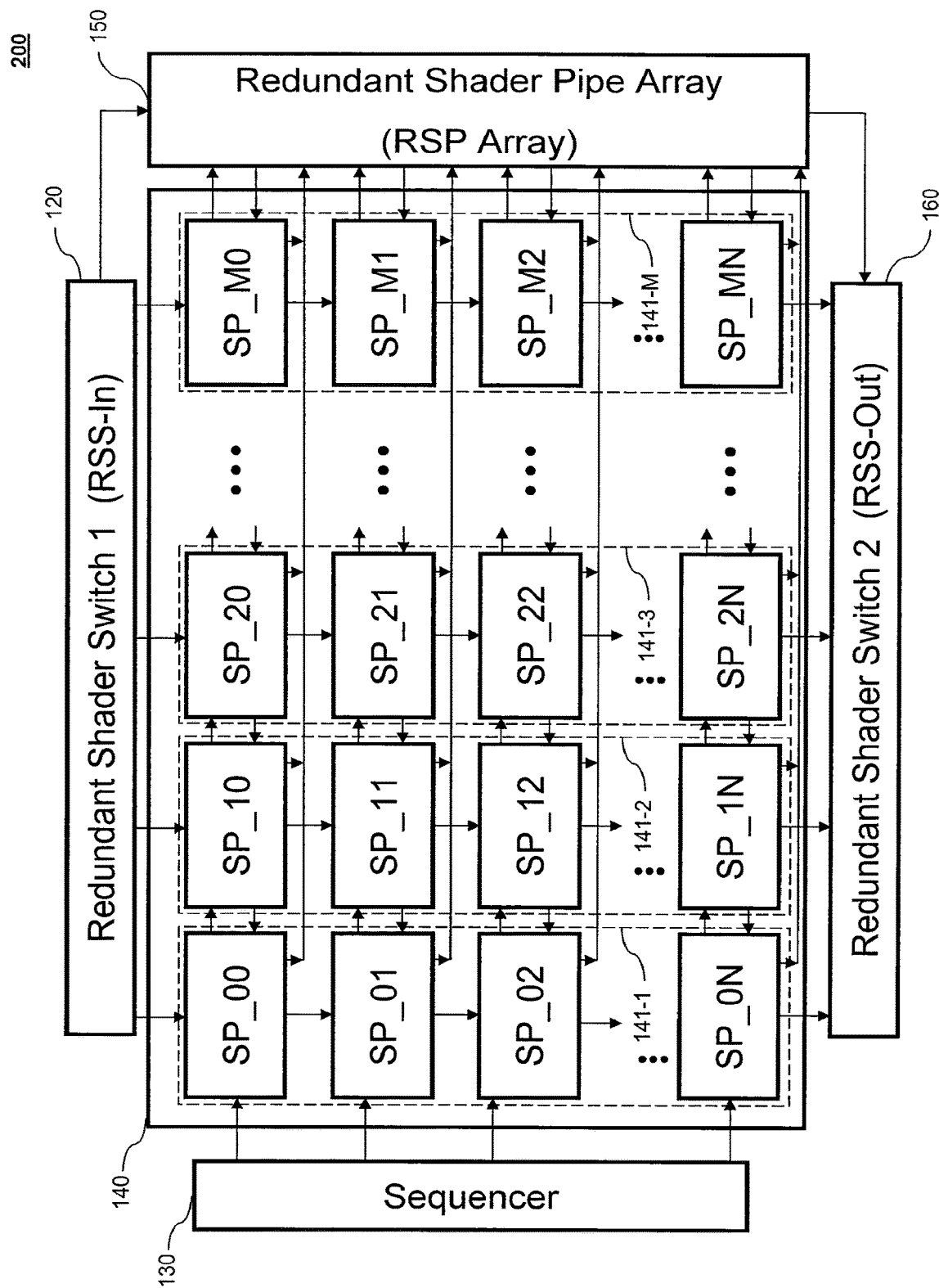
FIG. 2 is a system diagram depicting an implementation of a redundant shader pipe repair system illustrating the details of a shader pipe array.

FIG. 2 illustrates a more detailed view of the shader pipe array 140 according to an embodiment of the present invention. In this embodiment, shader pipe array 140 comprises one or more vertical shader pipe columns shown as vertical shader pipe columns 141-1, 141-2, 141-3, and 141-4 through 141-M, where "M" represents a positive integer greater than one. Each vertical shader pipe column, such as 141-1A, comprises one or more shader pipe blocks, here represented as SP_00 through SP_0N, where "N" represents a positive integer greater than one.

In FIG. 2, as an example, if sequencer 130 identifies the shader pipe located in shader pipe block SP_12 as being defective, then RSS-In 120 would transfer the data originally destined to the defective pipe, SP_12, via the horizontal path, to redundant shader pipe array 150 for processing. Once redundant shader pipe array 150 processes the shader pipe data originally destined to the defective shader pipe, the processed shader pipe data would be transferred from redundant shader pipe array 150 to RSS-Out 160.

Figure 3:
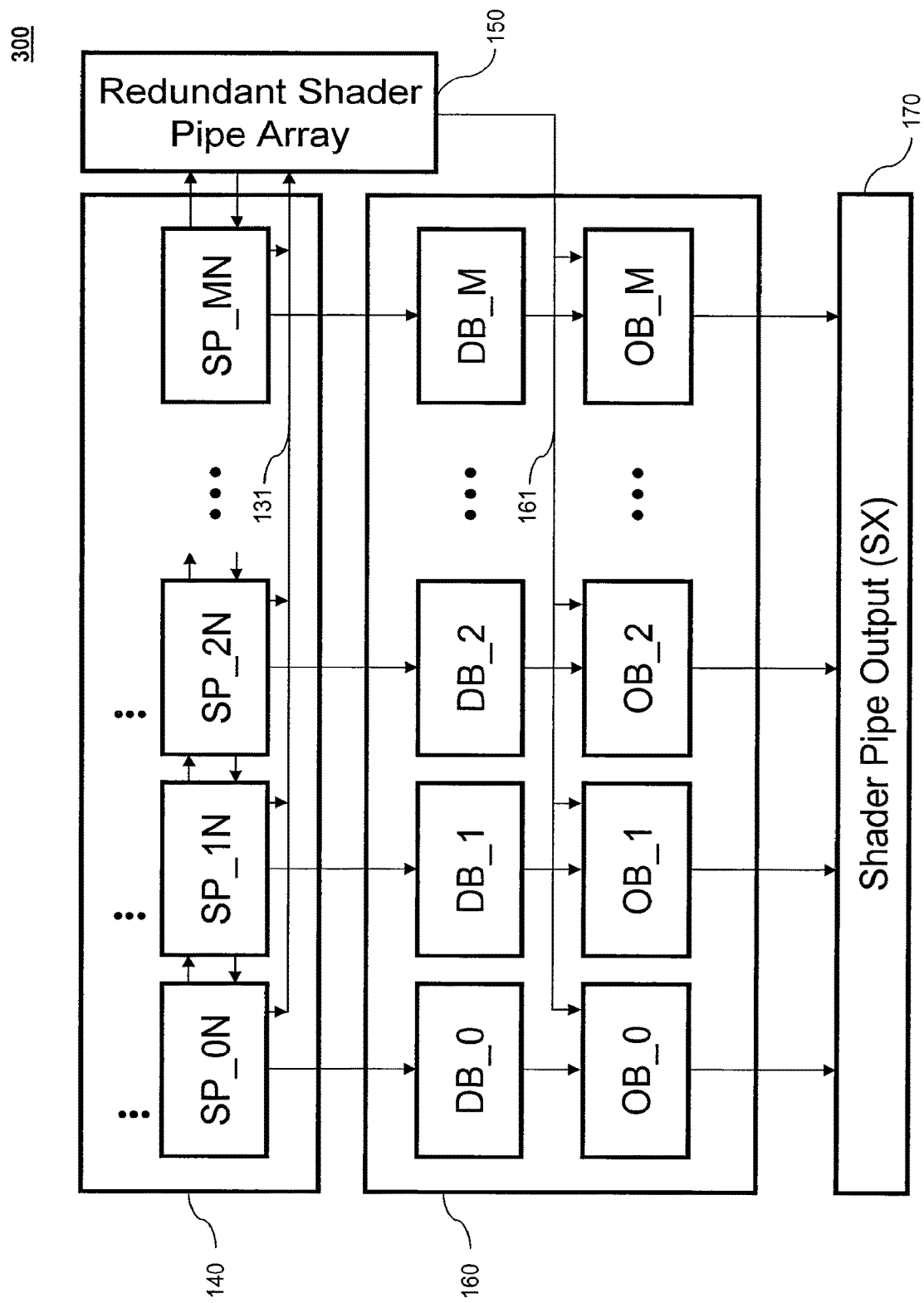
FIG. 3 is a system diagram depicting an implementation of a redundant shader pipe repair system illustrating the details of a redundant shader switch output.

FIG. 3 illustrates a more detailed view of RSS-Out 160 according to an embodiment of the present invention. RSS-Out 160 comprises a set of delay buffers labeled DB_0 through DB_M and a set of output buffers labeled OB_0 through OB_M. Each set of delay buffers and output buffers, for example DB_0 and OB_0, are aligned with the corresponding vertical shader pipe column in shader pipe array 140, e.g., column 0 comprised of block SP_00 through SP_0N.

The purpose of a delay buffer is to hold the data output of the vertical shader pipe column in shader pipe array 140 for a sufficient period of time to allow redundant shader pipe array 150 results to be re-aligned to complete the processing of shader pipe data and to transfer the processed shader pipe data back to the appropriate column of RSS-Out 160. As an example, if sequencer 130 indicates a defective shader pipe in vertical shader pipe column 2, specifically in block SP_2N, then shader pipe data that was destined for the defective shader pipe SP_2N would be transferred to redundant shader pipe array 150 via the horizontal path associated with row N, illustrated in FIG. 3 as 131. Redundant shader pipe array 150 would process the shader pipe data and would then return the processed shader pipe data to RSS-Out 160 via the return path illustrated in FIG. 3 as 161. In this example, since the defective pipe was located in column 2, the processed shader pipe data would be returned to output buffer OB_2. Because of the delay buffer, in this example DB_2, the output buffer, in this case OB_2 would be able to insert the processed shader pipe data into the output stream for column 2 to take the place of the shader pipe data that was originally in SP_2N.

In one embodiment, the data can be processed as a Single Instruction Multiple Data (SIMD) where the defective lane is replaced with a redundant unit where sequencer 130 issues all the instructions necessary for processing, including export instructions. Therefore, RSS-Out 160 performs a re-alignment of the data on an instruction basis. However, in another embodiment, the SIMD approach can be replaced by a Multiple Instruction stream, Multiple Data stream (MIMD) where the components function in a parallel and independent manner.

Figure 4:
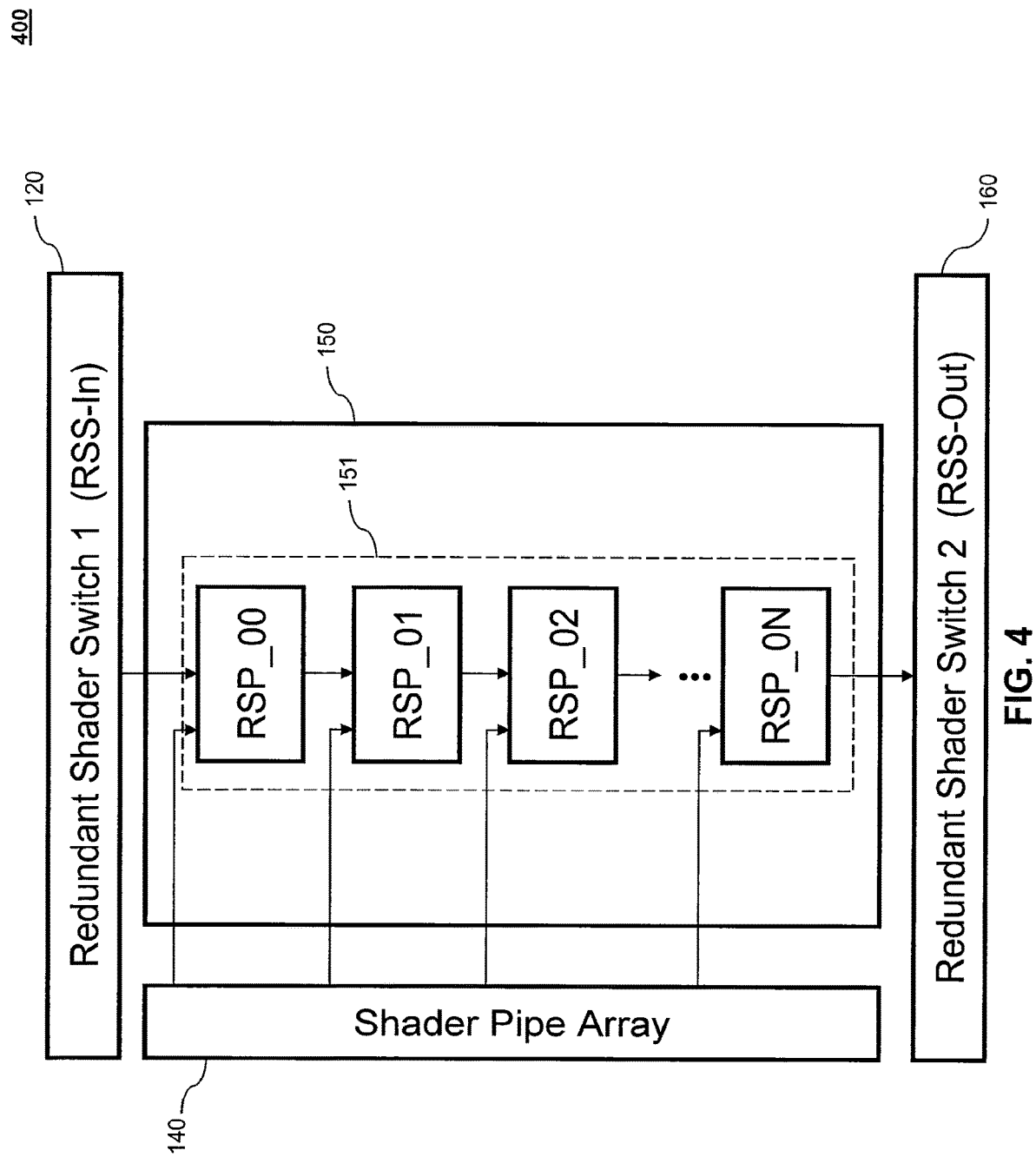
FIG. 4 is a system diagram depicting an implementation of a redundant shader pipe repair system illustrating the details of a redundant shader pipe array in a single column.

FIG. 4 illustrates a more detailed view of redundant shader pipe array 150 according to an embodiment of the present invention. In this embodiment redundant shader pipe array 150 comprises a single column outlined in FIG. 4 as 151. In this configuration redundant shader pipe array 150 can process shader pipe data destined for up to one defective shader pipe per row, but can repair up to N rows. The RSP_00 block can process shader pipe data destined for a single defective shader pipe within row 0 of shader pipe array 140 that comprises blocks SP_00 through SP_M0. In a similar manner block RSP_01 can process shader pipe data destined for a single defective shader pipe within row 1 of shader pipe array 140 that comprises blocks SP_01 through SP_M1 and so forth for redundant shader pipe array 150 rows through RSP_0N.

Figure 5:
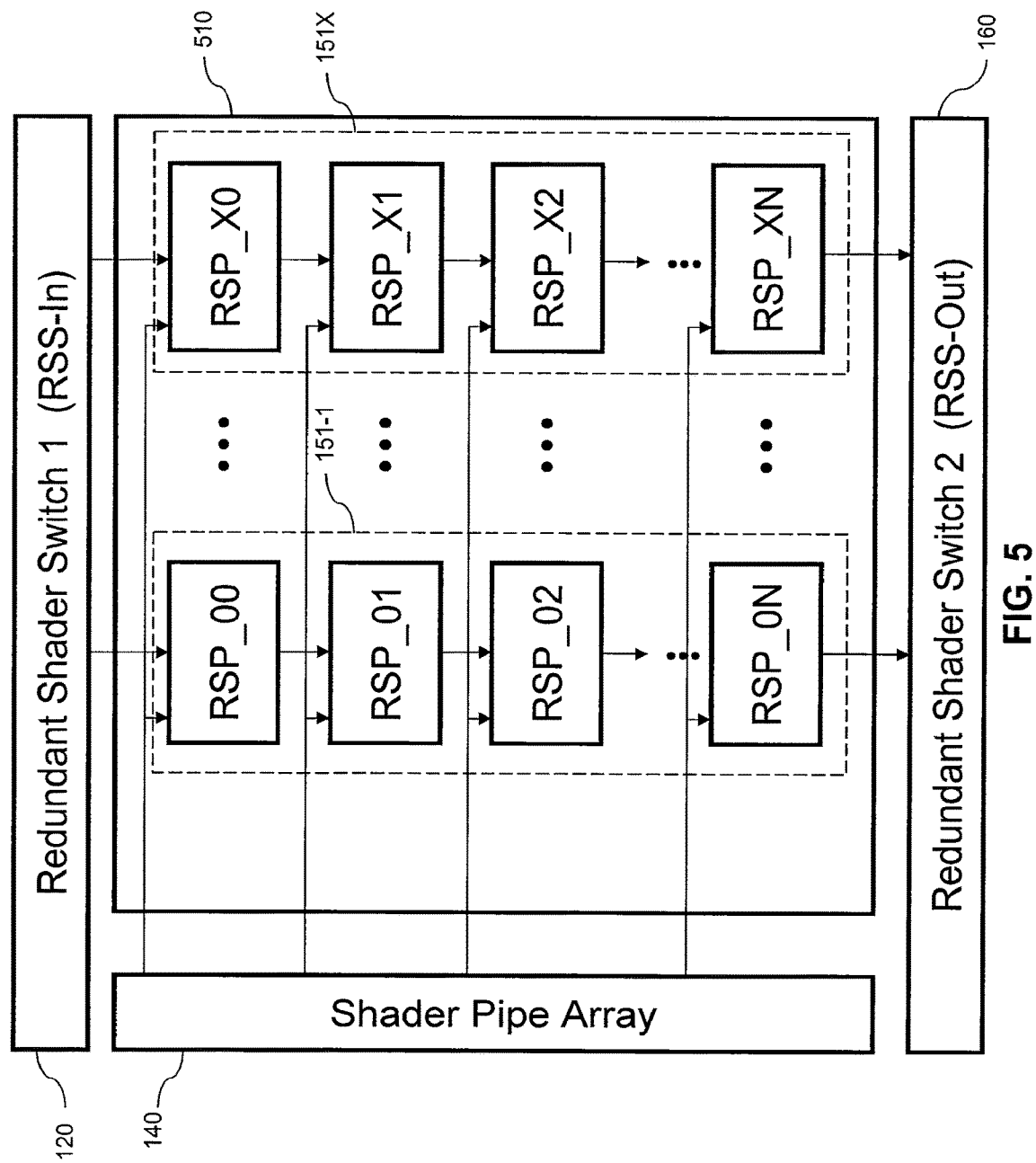
FIG. 5 is a system diagram depicting an implementation of a redundant shader pipe repair system illustrating the details of a multiple column redundant shader pipe array.

FIG. 5 illustrates a multi-column redundant shader pipe array 510 according to an embodiment of the present invention. In this embodiment redundant shader pipe array 510 comprises multiple columns outlined in FIG. 5 as 151-1 through 151X, where X is a positive integer greater than one. In this configuration redundant shader pipe array 510 can process shader pipe data destined for up to X defective shader pipes per row. The number of columns ("X") in redundant shader pipe array 510 is independent of the number of columns in shader pipe array 140 ("M"), but would be a function of the number of concurrent defective shader pipes in a single row for which shader pipe data is desired to be simultaneously processed.

Figure 6:
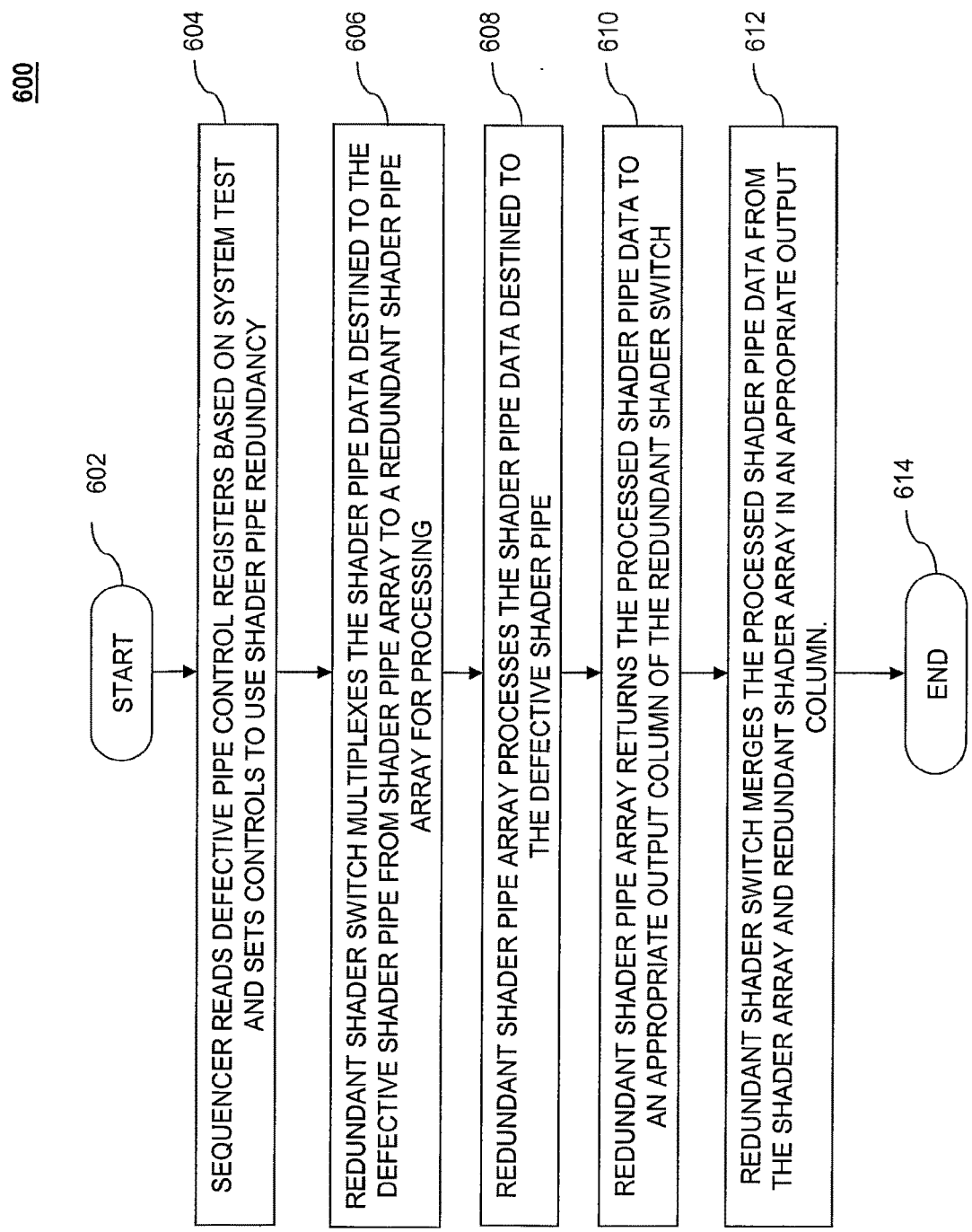
FIG. 6 is a flowchart depicting an implementation of a method for redundant shader pipe repair.

FIG. 6 is a flowchart depicting a method 600 for shader pipe data repairing using a redundant shader switch. Method 600 begins at step 602. In step 604, a sequencer reads defective shader pipe control registers based on system test results and set controls to use shader pipe redundancy. In step 606 a redundant shader switch multiplexes the shader pipe data destined to a defective shader pipe from the shader pipe array to a redundant shader pipe array for processing. In step 608 the redundant shader pipe performs the actual processing of the shader pipe data that was destined to the defective shader pipe.

In step 610, the redundant shader pipe array returns the processed shader pipe data to the appropriate output column of the redundant shader switch. In step 612 the redundant shader switch merges the processed shader pipe data from the shader array and redundant shader array in the appropriate output column.

The functions, processes, systems, and methods outlined in FIGS. 1, 2, 3, 4, 5, and 6 can be implemented in software, firmware, or hardware, or using any combination thereof. If programmable logic is used, such logic can execute on a commercially available processing platform or a special purpose device.

As would be apparent to one skilled in the relevant art, based on the description herein, embodiments of the present invention can be designed in software using a hardware description language (HDL) such as, for example, Verilog or VHDL. The HDL-design can model the behavior of an electronic system, where the design can be synthesized and ultimately fabricated into a hardware device. In addition, the HDL-design can be stored in a computer product and loaded into a computer system prior to hardware manufacture.

It is to be appreciated that the Detailed Description section, and not the Summary and Abstract sections, is intended to be used to interpret the claims. The Summary and Abstract sections can set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
a redundant shader pipe array configured to perform rendering calculations on data provided thereto;
a shader pipe array comprising a plurality of shader pipes, each of the plurality of shader pipes being configured to receive data dispatched to the respective shader pipe and perform rendering calculations on the received data dispatched thereto;
a circuit configured to identify a defective shader pipe of the plurality of shader pipes in the shader pipe array, and, in response to identifying the defective shader pipe, generate a signal; and
a redundant shader switch configured to:
receive the generated signal, and
in response to receiving the generated signal, transfer data that has already been dispatched to and received by the shader pipe array to the redundant shader pipe array.

2. The system of claim 1, wherein the redundant shader switch is further configured to transfer the data that has already been dispatched to and received by the defective shader pipe without transferring the data for all other shader pipes in the shader pipe array that were not identified as being defective.

3. The system of claim 1, wherein the redundant shader switch is further configured to directly switch the data that has already been dispatched to and received by the defective shader pipe via a horizontal path to the redundant shader pipe array.

4. The system of claim 1, wherein:
the shader pipe array further comprises a plurality of vertical shader pipe columns, each of the plurality of vertical shader pipe columns comprising at least one of the plurality of shader pipes, and
the redundant shader switch further comprises a plurality of delay buffers and a plurality of output buffers, each of the plurality of output buffers being coupled to a respective one of the plurality of delay buffers and aligned with a respective vertical shader pipe column.

5. The system of claim 4, wherein:
the plurality of delay buffers are configured to contain data output of the corresponding vertical shader pipe columns for a sufficient period of time to allow a result for the redundant shader pipe array to be re-aligned, and
an output buffer of the plurality of output buffers coupled to the at least one defective shader pipe is configured to receive the result from the redundant shader pipe array.

6. The system of claim 4, wherein the redundant shader switch further comprises a plurality of return paths communicatively coupling each of the plurality of output buffers to the redundant shader pipe array.

7. The system of claim 1, wherein the redundant shader pipe array is configured to receive data to be processed from sources other than via transfer from the redundant shader switch on a condition that at least one of the circuit does not identify any shader pipes in the shader pipe array as being defective or the circuit identifies the defective shader pipe as being intermittently defective.

8. A method comprising:
identifying a defective shader pipe of a plurality of shader pipes in a shader pipe array; and
in response to identifying the defective shader pipe, generating a signal directing a redundant shader switch to transfer data for the defective shader pipe to a redundant shader pipe array,
wherein the data is directly transferred from the defective shader pipe to the redundant shader pipe array after the data is sent to and received by the shader array.

9. The method of claim 8, wherein the generating further comprises generating the signal directing the redundant shader switch to transfer the data from the defective shader pipe without transferring the data from all other shader pipes in the shader pipe array that were not identified as being defective.

10. A system comprising:
a redundant shader pipe array configured to perform rendering calculations on data provided thereto;
a shader pipe array comprising:

a plurality of shader pipes, each of the plurality of shader pipes being configured to receive data dispatched to the respective shader pipe and perform rendering calculations on the received data provided thereto, and at least one direct path between the shader pipe array and the redundant shader pipe array;

a circuit configured to identify a defective shader pipe of the plurality of shader pipes in the shader pipe array, and, in response to identifying the defective shader pipe, generate a signal; and a redundant shader switch configured to:

receive the generated signal, and in response to receiving the generated signal, transfer the data that has already been dispatched to and received by the shader pipe array to the redundant shader pipe array via the at least one direct path.

11. The system of claim 10, wherein the redundant shader switch is further configured to transfer the data that has already been dispatched to and received by the defective shader pipe without transferring the data for all other shader pipes in the shader pipe array that were not identified as being defective.

12. The system of claim 10, wherein:

the shader pipe array further comprises a plurality of vertical shader pipe columns, each of the plurality of vertical shader pipe columns comprising at least one of the plurality of shader pipes, and the redundant shader switch further comprises a plurality of delay buffers and a plurality of output buffers, each of the plurality of output buffers being coupled to a respective one of the plurality of delay buffers and aligned with a respective vertical shader pipe column.

13. The system of claim 12, wherein:

the plurality of delay buffers are configured to contain data output of the corresponding vertical shader pipe columns for a sufficient period of time to allow a result for the redundant shader pipe array to be re-aligned, and an output buffer of the plurality of output buffers coupled to the at least one defective shader pipe is configured to receive the result from the redundant shader pipe array.

14. The system of claim 12, wherein the redundant shader switch further comprises a plurality of return paths communicatively coupling each of the plurality of output buffers to the redundant shader pipe array.

15. The system of claim 10, wherein the redundant shader pipe array is configured to receive data to be processed from sources other than via transfer from the redundant shader switch on a condition that at least one of the circuit does not identify any shader pipes in the shader pipe array as being defective or the circuit identifies the defective shader pipe as being intermittently defective.

16. The system of claim 10, wherein the shader pipe array comprises a plurality of rows and columns of shader pipes, and the at least one direct path comprises one direct path per row of shader pipes, each communicatively coupled between all of the shader pipes in a respective row and the redundant shader pipe array.

\* \* \* \* \*